United States Patent
Dong et al.

(10) Patent No.: US 9,777,785 B2
(45) Date of Patent: Oct. 3, 2017

(54) WET FRICTION MATERIAL

(75) Inventors: Feng Dong, Rochester Hills, MI (US); Robert C. Lam, Rochester Hills, MI (US); Timothy P. Newcomb, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 1411 days.

(21) Appl. No.: 13/205,339

(22) Filed: Aug. 8, 2011

(65) Prior Publication Data
US 2013/0037373 A1    Feb. 14, 2013

(51) Int. Cl.
| F16D 65/00 | (2006.01) |
| F16D 65/02 | (2006.01) |
| F16D 65/04 | (2006.01) |
| F16D 69/02 | (2006.01) |
| F16D 13/64 | (2006.01) |

(52) U.S. Cl.
CPC ........... F16D 69/026 (2013.01); *F16D 13/64* (2013.01); *F16D 2200/0065* (2013.01); *F16D 2200/0069* (2013.01); *F16D 2200/0073* (2013.01); *Y10T 428/25* (2015.01); *Y10T 428/26* (2015.01)

(58) Field of Classification Search
CPC .. F16D 69/26; F16D 2200/65; F16D 2200/69; F16D 2200/73
USPC ......... 428/98, 143, 304.4, 317.9; 188/251 A, 188/251 R
See application file for complete search history.

(56) References Cited

U.S. PATENT DOCUMENTS

| 5,856,244 | A | 1/1999 | Lam et al. |
| 5,964,334 | A | 10/1999 | Shimoda et al. |
| 6,182,804 | B1 | 2/2001 | Lam |
| 7,294,388 | B2 | 11/2007 | Lam et al. |
| 7,628,941 | B2 | 12/2009 | Krause et al. |
| 8,021,744 | B2 | 9/2011 | Lam et al. |
| 2004/0033341 | A1* | 2/2004 | Lam et al. ............. 428/143 |
| 2005/0284595 | A1 | 12/2005 | Conley et al. |
| 2008/0176470 | A1 | 7/2008 | Filip et al. |
| 2009/0039564 | A1* | 2/2009 | Krause et al. ......... 264/514 |

FOREIGN PATENT DOCUMENTS

| CN | 1603379 A | 4/2005 |
| CN | 101759862 A | 6/2010 |
| DE | 202006000062 U1 * | 6/2007 |
| EP | 0971151 A1 | 1/2000 |
| EP | 1607653 A1 | 12/2005 |

(Continued)

OTHER PUBLICATIONS

Engineered Fibers Technology,LLC ;Product Information; EFTec Nanofibrillated Fibers ; copyright 2007; 2 pages.

(Continued)

*Primary Examiner* — Matthew Matzek
(74) *Attorney, Agent, or Firm* — BrooksGroup

(57) ABSTRACT

A wet friction material for use in a wet clutch includes a friction interfacing surface for experiencing frictional engagement with an opposed surface in the presence of a lubricant. At least a portion of the friction interfacing surface comprises fibrillated nanofibers, which define a nanofibrous web, and friction adjusting particles held by the nanofibrous web. A cured resin may adhere the fibrillated nanofibers and the friction adjusting particles to provide structural support for the friction material.

28 Claims, 4 Drawing Sheets

(56) References Cited

FOREIGN PATENT DOCUMENTS

| | | | |
|---|---|---|---|
| JP | 59103040 | A | 6/1984 |
| JP | 419425 | A | 1/1992 |
| JP | 08061385 | A | 3/1996 |
| JP | 10103373 | A | 4/1998 |
| JP | 200492906 | A | 3/2004 |
| JP | 200645505 | A | 2/2006 |
| JP | 2007246590 | A | 9/2007 |
| JP | 2008503661 | A | 2/2008 |

OTHER PUBLICATIONS

Chinese Office Action dated Sep. 27, 2016 ; Application No. 201280036450.5 ; Applicant: BorgWarner Inc.; 6 pages.
Chinese Office Action dated Apr. 13, 2016; Application No. 201280036450.5; Applicant: BorgWarner Inc.; 9 pages.
Japanese Office Action dated Mar. 28, 2016; Application No. 2014-525087; Applicant: Shinji Ohga; 20 pages.
European Search Report dated May 15, 2015;Application No. 12821491.3-1355/2742253 PCT/US2012049716; Applicant: BorgWarner Inc.; 6 pages.
Japanese Office Action dated Dec. 1, 2016 ; Application No. 2014-525087; Applicant: BorgWarner Inc.; 25 pages.
Chinese Office Action dated Aug. 20, 2015 ; Application No. 201280036450.5 ; Applicant: BorgWarner Inc. ; 18 pages.

* cited by examiner

WET FRICTION MATERIAL

TECHNICAL FIELD

The technical field of this disclosure relates generally to a friction material for use in a wet clutch incorporated into a vehicle transmission or other lubricated powertrain component.

BACKGROUND

Several components of a motor vehicle powertrain may employ a wet clutch to facilitate the transfer of power from the vehicle's power generator (i.e, an internal combustion engine, electric motor, fuel cell, etc.) to the drive wheels. A transmission located downstream from the power generator and which enables vehicle launch, gear shifting, and other torque transfer events is one such component. Some form of a wet clutch may be found throughout many different types of transmissions currently available for motor vehicle operation. A wet clutch may be utilized in a torque converter for an automatic transmission, a multi-plate wet clutch pack for an automatic transmission or a semi-automatic dual-clutch transmission (DCT), and a wet start clutch that may be incorporated into a sportier automatic transmission equipped with as many as seven to nine gears as a substitute for the torque converter, to name but a few examples. Similar wet clutches may be found elsewhere in the vehicle powertrain besides the transmission.

A wet clutch is an assembly that interlocks two or more opposed, rotating surfaces in the presence of a lubricant by imposing selective interfacial frictional engagement between those surfaces. A friction clutch plate, a band, a synchronizer ring, or some other part that provides one of these engageable rotating surfaces typically supports a friction material to effectuate the intended interlocking frictional engagement. The presence of the lubricant at the friction interface cools and reduces wear of the friction material and permits some initial slip to occur so that torque transfer proceeds gradually, although very quickly, in an effort to avoid the discomfort that may accompany an abrupt torque transfer event (i.e, shift shock). But maintaining the lubricant at the friction interface has an adverse impact on fuel efficiency. This is because the power needed to pump the lubricant, usually under pressure, to and from the friction interface at a flow rate that keeps the surface of the friction material below a certain temperature is ultimately siphoned from the power generator.

Conventional friction materials generally cannot function reliably at surface temperatures above 300-350° C. Above those temperatures, such friction materials tend to suffer from lubricant thermal degradation and glazing—a process in which the surface of the friction material accumulates thermally degraded lubricant additives to form a substantially impenetrable sludge deposit. A surface-glazed friction material may contribute to a variety of complications including shuddering and an inconsistent coefficient of friction across the friction interface. Exactly how much lubricant needs to be circulated over the friction material to sustain a low enough surface temperature depends on the configuration of the wet clutch and the surface area of the friction interface between the opposed, rotating surfaces.

SUMMARY OF THE DISCLOSURE

A wet friction material for use in a wet clutch includes a friction interfacing surface for experiencing frictional engagement with an opposed surface in the presence of a lubricant. At least a portion of the friction interfacing surface comprises fibrillated nanofibers, which define a nanofibrous web, and friction adjusting particles held by the nanofibrous web. A cured resin may adhere the fibrillated nanofibers and the friction adjusting particles to provide structural support.

DETAILED DESCRIPTION

Figure 1:
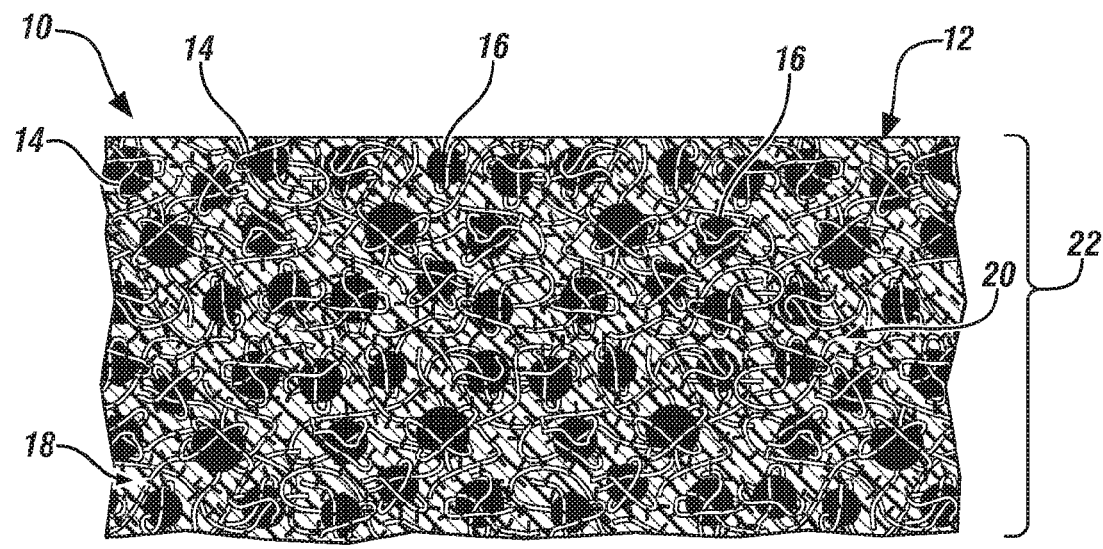
FIG. 1 depicts a cross-sectional illustration of a wet friction material in which a friction interfacing surface of the wet friction material comprises fibrillated nanofibers that support friction adjusting particles in a nanofibrous web formed by the fibrillated nanofibers. The wet friction material shown in FIG. 1 is an idealized illustration that is meant to aid in the conceptualization of its compositional structure. It is not drawn to scale and is not intended to represent relative sizes of the fibrillated nanofibers and the friction adjusting particles.

Various embodiments of a wet friction material for use in a wet clutch are represented as numeral 10 in FIG. 1. The wet friction material 10 includes a friction interfacing surface 12 that experiences interfacial frictional engagement with an opposed mating surface (not shown) in the presence of a lubricant. Located at and adjacent to the friction interfacing surface 12 are fibrillated nanofibers 14 and friction adjusting particles 16 that may be adhered with a cured resin 18. The fibrillated nanofibers 14 and their many emanating fibrils form an interconnected nanofibrous web 20 that holds the friction adjusting particles 16 and keeps them at or near the friction interfacing surface 12. Some of the fibrillated nanofibers 14 and friction adjusting particles 16 are exposed at the friction interfacing surface 12 for contact with the opposed mating surface during frictional engagement. The ability of the nanofibrous web 20 to keep the friction adjusting particles 16 at or near the friction interfacing surface 12 provides the friction material 10 with a stable coefficient of friction and a positive $\mu$-v relationship. Moreover, in some instances, the fibrillated nanofibers 14 can have an anti-glazing effect if they are susceptible to thermal decomposition. The thermal decomposition of the fibrillated nanofibers 14 can help resist glazing by stripping surface-deposited glaze material from the friction interfacing surface 12 and constantly exposing fresh fibrillated nanofibers.

Figure 2:
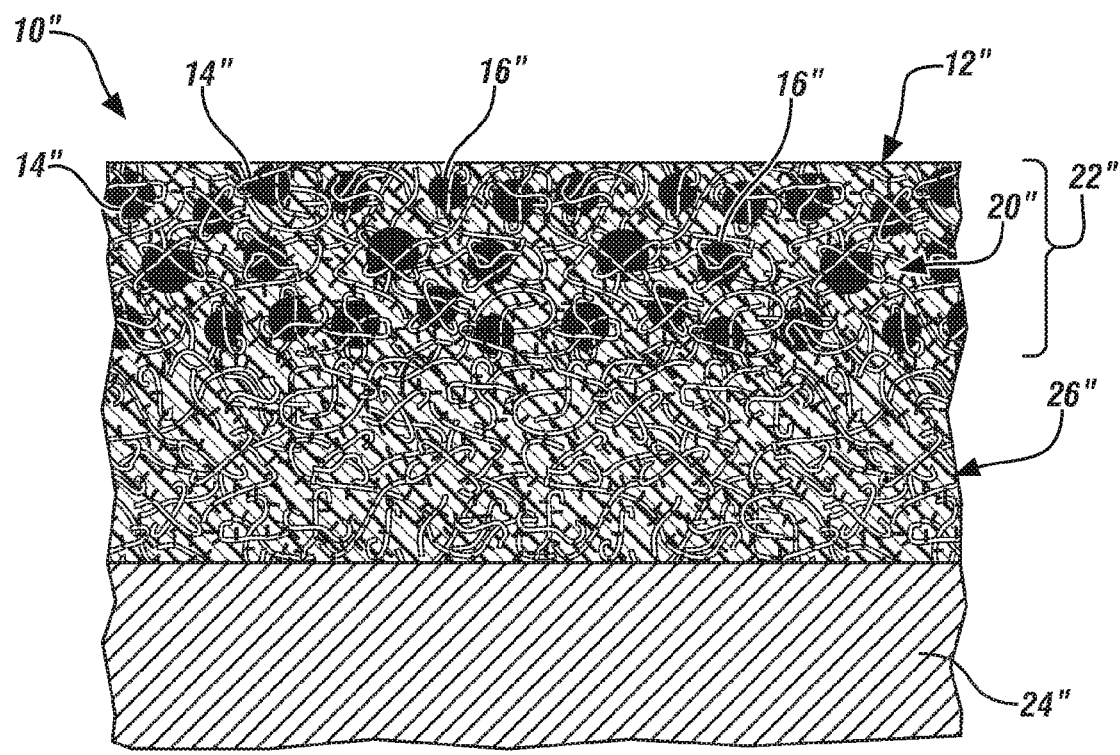
FIG. 2 depicts a cross-sectional illustration of a wet friction material, bonded to a substrate, in which the wet friction material includes a friction stability region adjacent to a friction interfacing surface of the friction material. The friction stability region comprises fibrillated nanofibers and friction adjusting particles held by a nanofibrous web formed by the fibrillated nanofibers. The wet friction material shown in FIG. 2 is an idealized illustration that is meant to aid in the conceptualization of its compositional structure. It is not drawn to scale and is not intended to represent relative sizes of the fibrillated nanofibers and the friction adjusting particles.
Figure 3:
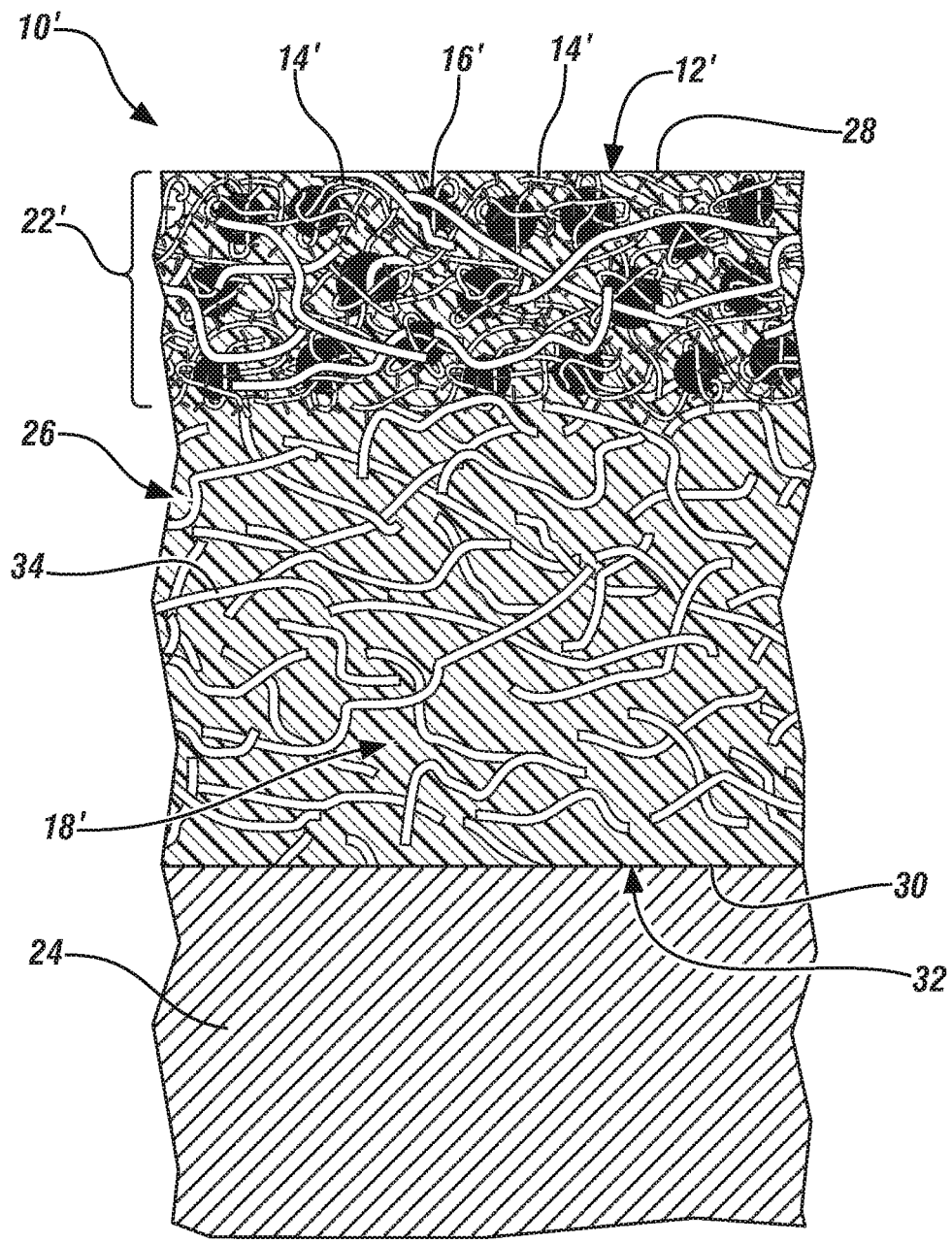
FIG. 3 depicts a cross-sectional illustration of a wet friction material, bonded to a substrate, in which the wet friction material includes a friction stability region adjacent to a friction interfacing surface of the friction material. The friction stability region comprises fibrillated nanofibers and friction adjusting particles held by a nanofibrous web formed by the fibrillated nanofibers. The wet friction material shown in FIG. 3 is an idealized illustration that is meant to aid in the conceptualization of its compositional structure. It is not drawn to scale and is not intended to represent relative sizes of the base structural fibers, the fibrillated cellulose nanofibers, and the friction adjusting particles.

The friction material 10 may have a thickness defined by the distance between the friction interfacing surface 12 and an oppositely facing bonding surface (not shown in FIG. 1). The oppositely facing bonding surface is the surface of the friction material 10 where bonding to an underlying base substrate or other material is meant to be accomplished. A friction stability region 22 that extends from the friction interfacing surface 12 and towards the oppositely facing bonding surface may include a balanced amount of the fibrillated nanofibers 14 and the friction adjusting particles 16. The friction stability region 22 may extend from the friction interfacing surface to a depth up to about 40%, up to about 20%, up to about 10%, or up to about 5% of the thickness of the friction material 10. For example, if the friction material 10 is about 0.25 mm to about 2 mm thick, which is typical for a wet friction material applied to a clutch plate in a transmission, the friction stability region 22 may extend inwards from the friction interfacing surface 12 to a depth up to about 0.0125 mm (5% of 0.25 mm) to about 0.80 mm (40% of 2 mm). The rest of the friction material 10 underlying the friction stability region 22 can have the same general construction as the friction stability region 22 or a different construction. That is, the friction material 10 may be constructed (1) entirely from the fibrillated nanofibers 14 and the friction adjusting particles 16 and be adhered by the cured resin 18, (2) from a base fibrous material in which the fibrillated nanofibers 14 and the friction adjusting particles 16 are present at or near the top of the base fibrous material, as shown in FIGS. 2 and 3, and be adhered by the cured resin 18 or (3) from some other construction in which the balanced amount of fibrillated nanofibers 14 and friction adjusting particles 16 are present in the friction stability region 22.

The fibrillated nanofibers 14 may have diameters that range from about 20 nm to about 800 nm, from about 30 nm to about 600 nm, or from about 50 nm to about 500 nm, and lengths that range from about 1 mm to about 10 mm, from about 2 mm to about 8 mm, or from about 4 mm to about 6 mm. The degree of fibrillation of the fibrillated nanofibers 14, moreover, as measured by Canadian Standard Freeness (CSF), may range from about 5 ml CSF to about 300 ml CSF, from about 10 ml CSF to about 200 ml CSF, or from about 10 ml CSF to about 100 ml CSF. The CSF is an empirical procedure that measures that rate at which 3 grams of a fibrous pulp material in 1 liter of water may be drained (See TAPPI T227 for testing standard). A more fibrillated fibrous pulp material will have a lower water drainage rate and, thus, a lower "ml CSF" value, and a less fibrillated fibrous pulp material will have a higher "ml CSF" value. These physical characteristics of the fibrillated nanofibers 14 help enable the formation of the nanofibrous web 20 at the friction stability region 22 and facilitate strong binding support of the friction adjusting particles 16.

The fibrillated nanofibers 14 may be comprised of at least one of cellulose, an aramid, or an acrylic. A fibrillated cellulose nanofiber comprises at least 50 wt. %, in another embodiment at least 75 wt. %, and in another embodiment at least 90 wt. %, cellulose and/or a cellulose derivative. The cellulose may be natural cellulose or regenerated (artificial) cellulose. Natural cellulose is a straight chain polysaccharide that includes repeating $\beta(1\rightarrow4)$-glycosidic-linked glucose units and which has the general polymeric formula $(C_6H_{10}O_5)_n$ with the number of repeating units ("n") usually ranging from 100 to 10,000. Regenerated cellulose has the same chemical formula as natural cellulose and is prepared from naturally-occurring polymers (i.e., wood pulp or bamboo) from one of several processes including the viscose process, the cuprammonium process, and an organic solvent spinning process. Some examples of regenerated cellulose are rayon, modal, and lyocell. A cellulose derivative is a modified cellulose in which the hydroxyl group on the glucose units is fully or partially substituted with, for example, an organic (—O—CO—R) ester group. Some examples of a cellulose derivative are cellulose acetate and cellulose triacetate. A fibrillated aramid nanofiber comprises any synthetic aromatic polyamide including para-aramids, such as the condensation product of 1,4-phenylene-diamine and terephthaloyl chloride, and meta-aramids, such as the condensation product of m-phenylenediamine and isophthaloyl chloride. An fibrillated acrylic nanofiber comprises any synthetic acrylic polymer formed from at least 85 wt. % acrylonitrile monomers.

The friction adjusting particles 16 held in the nanofibrous web 20 may be comprised of any material that does not melt, soften, or decompose at a temperature below 400° C. A wide range of ceramic and rubber materials are available that can be fabricated into the friction adjusting particles 16. A non-exhaustive listing of suitable materials includes silica ($SiO_2$), carbon, graphite, alumina ($Al_2O_3$), magnesia (MgO), calcium oxide (CaO), titania ($TiO_2$), ceria ($CeO_2$), zirconia ($ZrO_2$), cordierite (a Mg/Fe/Al silicate), mullite (an aluminum silicate), sillimanite (an aluminum silicate), spodumene (a lithium aluminum silicate), petalite (a lithium aluminum silicate), zircon ($ZrSiO_4$), silicon carbide (SiC), titanium carbide (TiC), boron carbide ($B_4C$), hafnium carbide (HfC), silicon nitride ($Si_3N_4$), titanium nitride (TiN), titanium boride ($TiB_2$), cashew dust, a cured phenolic, and mixtures thereof. The diameters of the friction adjusting particles 16 may range from about 100 nm to about 80 µm, from about 500 nm to about 30 µM, or from about 800 nm to about 20 µm.

The friction adjusting particles 16 may, in one embodiment, be comprised of diatomaceous earth—a type of silica material. Diatomaceous earth is an inexpensive, abrasive material that exhibits a relatively high coefficient of friction and ensnares easily in the nanofibrous web 20 formed by the fibrillated nanofibers 14. All of the friction adjusting particles 16 may be composed of diatomaceous earth or, alternatively, some of the friction adjusting particles 16 may be diatomaceous earth and others may be carbon, graphite, and/or alumina depending on the friction characteristics sought at the friction interfacing surface 12 of the friction material 10. The several other materials may of course be used in combination with diatomaceous earth to constitute the friction adjusting particles 16. The use of diatomaceous earth alone or diatomaceous earth in combination with one or more of carbon, graphite, or alumina as the friction adjusting particles 16 just happens to be one particular approach.

The amount of the fibrillated nanofibers 14 and the supported friction adjusting particles 16 present in the friction stability region 22 can vary depending on the desired surface characteristics at the friction interfacing surface 12. Anywhere from about 1 lb to about 15 lbs of the fibrillated nanofibers 14 and anywhere from about 2 lbs to about 20 lbs of the friction adjusting particles 16—which are held in the nanofibrous web 20 formed by the fibrillated nanofibers 14—may be present in the friction stability region 22 per 3000 ft$^2$ of the friction material. The grammage unit of "lbs/3000 ft$^2$" is customarily used in the paper making industry as a measurement of weight based on given a surface area of a thin, fibrous layer, whether impregnated or not. Here, it expresses the weight of the fibrillated nanofibers 14 and the friction adjusting particles 16 that are contained in the wet friction material 10 for every 3000 ft$^2$ of the friction interfacing surface 12. In one particular embodiment, about 4 lbs to about 9 lbs of the fibrillated nanofibers 16 and about 12 lbs to about 17 lbs of the friction adjusting particles 16, each based on about 3000 ft$^2$ of the friction material 10, may be present in the friction stability region 22. The amounts of the fibrillated nanofibers 14 and the friction adjusting particles 16 can be chosen to affect the frictional characteristics of the friction material 10. The porosity of the friction material 10 at the friction interfacing surface 12, for instance, is inversely proportional to the amount of the fibrillated nanofibers 14 present at the friction stability region 22. And the amount of the friction adjusting particles 16 present influences both the static and dynamic coefficient of friction that can be achieved at the friction interfacing surface 12. A higher coefficient of friction generally accompanies a higher amount of friction adjusting particles 16 and vice versa.

The cured resin 18 may be any thermosetting resin suitable for providing structural rigidity to the friction material 10. The cured resin 18 may, for example, be a phenolic resin or a phenolic-based resin. A phenolic resin is a class of thermosetting resins that is produced by the condensation of an aromatic alcohol, typically a phenol, and an aldehyde, typically a formaldehyde. A phenolic-based resin is a thermosetting resin blend that includes at least 50 wt. % of a phenolic resin based on the total weight of all resins and excluding any solvents or processing acids. Some examples of other thermosetting resins that may be blended with a phenolic resin include silicone resins, epoxy resins, and polybutadiene resins, to name but a few examples. The cured resin 18 confers strength and rigidity to the friction material 10 and, as previously indicated, adheres the fibrillated nanofibers 14 and the friction adjusting particles 16 in the friction stability region 22 while maintaining the desired porosity throughout the friction material 10 for proper lubricant flow and retention.

One embodiment of the wet friction material, represented by numeral 10', is shown in FIG. 3, in which like numerals denote the applicability of earlier descriptions relating to those elements or features. The wet friction material 10' is bonded to a substrate 24 by any suitable technique known to skilled artisans. Several examples of the substrate 24 include, but are not limited to, a clutch plate, a synchronizer ring, and a transmission band. The wet friction material 10' includes a friction interfacing surface 12' and an oppositely facing bonding surface 32. The friction interfacing surface 12' experiences select interfacial frictional engagement with an opposed, rotating surface (not shown) in the presence of a lubricant and the oppositely facing bonding surface 32 achieves bonded attachment to the substrate with the aid of an adhesive or some other suitable bonding technique. The lubricant may be any suitable lubricating fluid such as, for example, an automatic transmission fluid. The flow rate of the lubricant over the wet friction material 10' can be managed to allow the temperature at the friction interfacing surface 12' to exceed 350° C. for extended periods in an effort to improve fuel efficiency. While the wet friction material 10' performs satisfactorily above 350° C., and up to about 500° C., it is not limited only to such high-temperature environments and may, if desired, be used in a wet clutch designed to maintain a temperature at the friction interfacing surface 12' below 350° C.

The wet friction material 10' may include a base fibrous material 26 that supports the friction stability region 22' of the friction material 10'. The base fibrous material 26 has a top surface 28 and a bottom surface 30 that define a thickness of the base fibrous material 26 which typically ranges from about 0.25 mm to about 2 mm. The fibrillated nanofibers 14' and the friction adjusting particles 16' that form the friction stability region 22' may be highly intermingled with the base fibrous material 26 (as shown here in FIG. 3) such that the top surface 28 of the base fibrous material 26 is generally coincident with the friction interfacing surface 12' of the wet friction material 10' or, in another embodiment, the fibrillated nanofibers 14' and the friction adjusting particles 16' may be partially intermingled with the base fibrous material 26 and form a surface layer up to about 70 μM, up to about 50 μM, up to about 20 μM, or up to about 10 μm thick such that the top surface 28 of the base fibrous material 26 is not coincident with the friction interfacing surface 12. A variety of characteristics of the wet friction material 10' may determine to what extent the fibrillated nanofibers 14' and the friction adjusting particles 16' infiltrate, or accumulate on, the top surface 28 of the base fibrous material 26. These characteristics include the porosity of the base fibrous material 26 and the amounts of the fibrillated nanofibers 14' and friction adjusting particles 16' contained in the friction stability region 22'. The bottom surface 30 of the base fibrous material 26 is located adjacent to the substrate 24 and is typically coincident with the oppositely facing bonding surface 32 of the wet friction material 10'. The cured resin 18' may be evenly distributed throughout the base fibrous material 26 as well as any portion of the friction stability region 22' located above the top surface 28 of the base fibrous material 26 to provide adherence, rigidity, and structural support. A typical weight percent of the cured resin 18' in the wet friction material 10' usually ranges from about 15% to about 50%, but more or less may certainly be present depending on the design specifications of the wet friction material 10'.

The friction stability region 22' of the wet friction material 10' may be constructed to permit regular regeneration of the friction interfacing surface 12' which, in turn, allows the wet friction material 10' to maintain its intended frictional performance for extended periods when the temperature at the friction interface exceeds 350° C. The bulk structure of the base fibrous material 26 may be provided by an arrangement of base structural fibers 34 and optional fillers. Located within the friction stability region 22' and intermingled with the base structural fibers 34 may be fibrillated cellulose nanofibers which may constitute all (100 wt. %) or part of the fibrillated nanofibers 14' such as, for example, about 10 wt. % to about 99 wt. %, about 30 wt. % to about 90 wt. %, about 50 wt. % to about 99 wt. %, or about 75 wt. % to about 99 wt. %. The fibrillated cellulose nanofibers may be comprised, for example, of regenerated lyocell cellulose or a blend of regenerated lyocell cellulose and natural cellulose. The total weight of the base fibrous material 26 may range anywhere from about 95 lbs to about 400 lbs per 3000 ft$^2$ of the wet friction material 10'. Standard paper- and fiber-making procedures known to skilled artisans can be employed to make the base fibrous network 26.

The base structural fibers 34 may have diameters that range from about 1 μm to about 500 μm and lengths that range from 2 mm to about 20 mm. The base structural fibers 34 may be woven, non-woven, or any other suitable construction. Many different types of materials may constitute the base structural fibers 34 depending on the desired properties of the wet friction material 10'. The base structural fibers 34 may, for example, include aramid (aromatic polyamide) fibers and/or carbon fibers, each of which is not susceptible to thermal decomposition at temperatures below 450° C., as well as cotton fibers, novoloid (phenol-formaldehyde) fibers, ceramic fibers, and/or glass fibers, each of which has various effects on frictional behavior. The base structural fibers 34 may be present in an amount that ranges from about 95 lbs to about 400 lbs per 3000 ft$^2$ of the wet friction material 10'.

The base structural fibers 34 contained in the base fibrous material 26 may, in one embodiment, be fibrillated aramid microfibers and carbon microfibers. The aramid microfibers may constitute about 40 wt. % to about 80 wt. % (about 38 lbs to about 320 lbs per 3000 ft$^2$ of the wet friction material 10') of the base structural fibers 34 and the carbon microfibers may constitute about 20 wt. % to about 60 wt. % (about 19 lbs to about 240 lbs per 3000 ft$^2$ of the we friction material 10') of the base structural fibers 34. The combination of these two types of microfibers provides the base fibrous material 26 with thermal and chemical stability and a high fatigue resistance well above 350° C. The degree of fibrillation of the aramid microfibers, as measured by the Canadian Standard Freeness (CSF), may range from about 250 ml CSF (more fibrillated) to about 650 ml CSF (less fibrillated). The carbon microfibers present along with the aramid microfibers may be natural or synthetic. They may be derived from the carbonization of several different precursors in filament-form including polyacrylonitrile (PAN), rayon, petroleum pitch, and/or coal tar pitch.

The fibrillated nanofibers 14' and the supported friction adjusting particles 16', as mentioned before, may be intermingled with the base structural fibers 34 at the friction stability region 22' which extends inward from the friction interfacing surface 12' of the wet friction material 10". Whether or not the base structural fibers 34 are exposed at the friction interfacing surface 12' depends on the amounts of the fibrillated nanofibers 14' and the friction adjusting particles 16' in the friction stability region 22' and the porosity of the base fibrous material 26. The base structural fibers 34 are more likely to be exposed when lesser amounts of the fibrillated cellulose nanofibers are present in the friction stability region 22' such as, for example, about 1 lb to about 6 lbs per 3000 ft$^2$ of the wet friction material 10', thus rendering the friction material 10' more porous at the friction interfacing surface 12'. Conversely, the structural fibers 34 are less likely to be exposed when greater amounts of the fibrillated nanofibers 14' are present in the friction stability region 22' such as, for example, about 8 lbs to about 15 lbs per 3000 ft$^2$ of the wet friction material 10', thus covering substantially all of the structural fibers 34 at the top surface 28 of the base fibrous material 26.

The friction material 10' can function reliably for extended periods in a low-lubricant flow environment in which the temperature at the friction interfacing surface 12' exceeds 350° C. That is, above 350° C., the friction material 10' can maintain a positive μ-v relationship and resist glazing. The friction material 10' exhibits this type of high-temperature performance because its friction interfacing surface 12' is able to be repeatedly regenerated. Such regeneration can be attributed to the presence of the fibrillated cellulose nanofibers and their supported friction adjusting particles 16' in the friction stability region 22' at their designated amounts of 1-15 lbs/3000 ft$^2$ and 2-20 lbs/3000 ft$^2$, respectively. The balanced content of those two materials (fibrillated cellulose nanofibers and friction adjusting particles 16') provides enough friction adjusting particles 16' at or near the friction interfacing surface 12' to sustain a positive μ-v relationship at elevated temperatures while permitting the fibrillated cellulose nanofibers closest to the friction interfacing surface 12' to thermally decompose at regular intervals.

Decomposition of the fibrillated cellulose nanofibers forms organic decomposition products and liberated friction adjusting particles 16' at the friction interfacing surface 12'. The removal of organic decomposition products and loose friction adjusting particles 16' during frequent interfacial frictional engagement and exposure to the lubricant takes undesirable surface deposited glaze material along with them and promotes porosity at the friction interfacing surface 12'. Over time, the regular thermal decomposition of the fibrillated cellulose nanofibers constantly exposes a fresh underlying batch of fibrillated cellulose nanofibers and supported friction adjusting particles 16'. This fresh batch functions at the frictional interfacing surface 12', as originally intended, until it heats up and the fibrillated cellulose nanofibers thermally decompose, and so on. Regenerating the friction interfacing surface 12' in this manner combats glazing by weakening any deposited surface glaze material and eventually removing it along with the organic decomposition products and loose friction adjusting particles 16'. As such, when temperatures at the friction interfacing surface 12' of the friction material 10' exceed 350° C., the friction stability region 22' is able to retain a suitable porosity at the friction interfacing surface 12', resist shuddering that may contribute to wear, and maintain a stable coefficient of friction at the friction interfacing surface 12' that increases with increasing rotational velocity (positive μ-v relationship).

Another embodiment of the wet friction material, represented by numeral 10", is shown in FIG. 2, in which like numerals denote the applicability of earlier descriptions relating to those elements or features. The friction material 10" is bonded to a substrate 24" and includes a friction interfacing surface 12" opposite the substrate 24" for experiencing select interfacial frictional engagement with an opposed, rotating surface (not shown) in the presence of a lubricant similar to the friction material 10' shown in FIG. 1. One difference here is the base fibrous material 26" used to fabricate the wet friction material 10" comprises an arrangement of fibrillated nanofibers 14" instead of the base structural fibers 34 previously described. The fibrillated nanofibers 14" in the base fibrous material 26" may be the same as those contained in the friction stability region 22" or different. Some examples of the fibrillated nanofibers 14" include cellulose nanofibers, fibrillated aramid nanofibers, fibrillated acrylic nanofibers, or mixtures thereof. The friction stability region 22" of the wet friction material 10" includes friction adjusting particles 16" held in a nanofibrous web 20" formed by the interacting fibrillated nanofibers 16".

EXAMPLES

Figure 4:
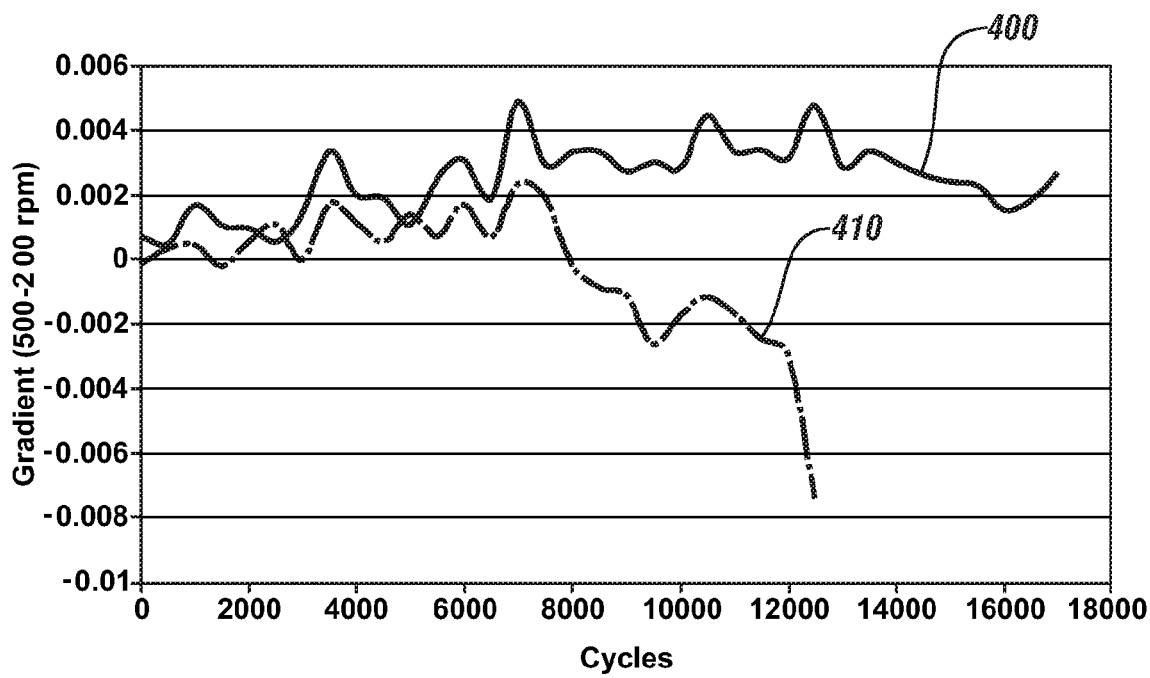
FIG. 4 is a graph that plots friction torque gradient (the difference in the friction material's coefficient of friction at a rotational speed of 500 rpm and 200 rmp) against the number of friction material engagement/disengagement cycles for a conventional friction material (410) and a friction material having a friction stability region (400).
Figure 5:
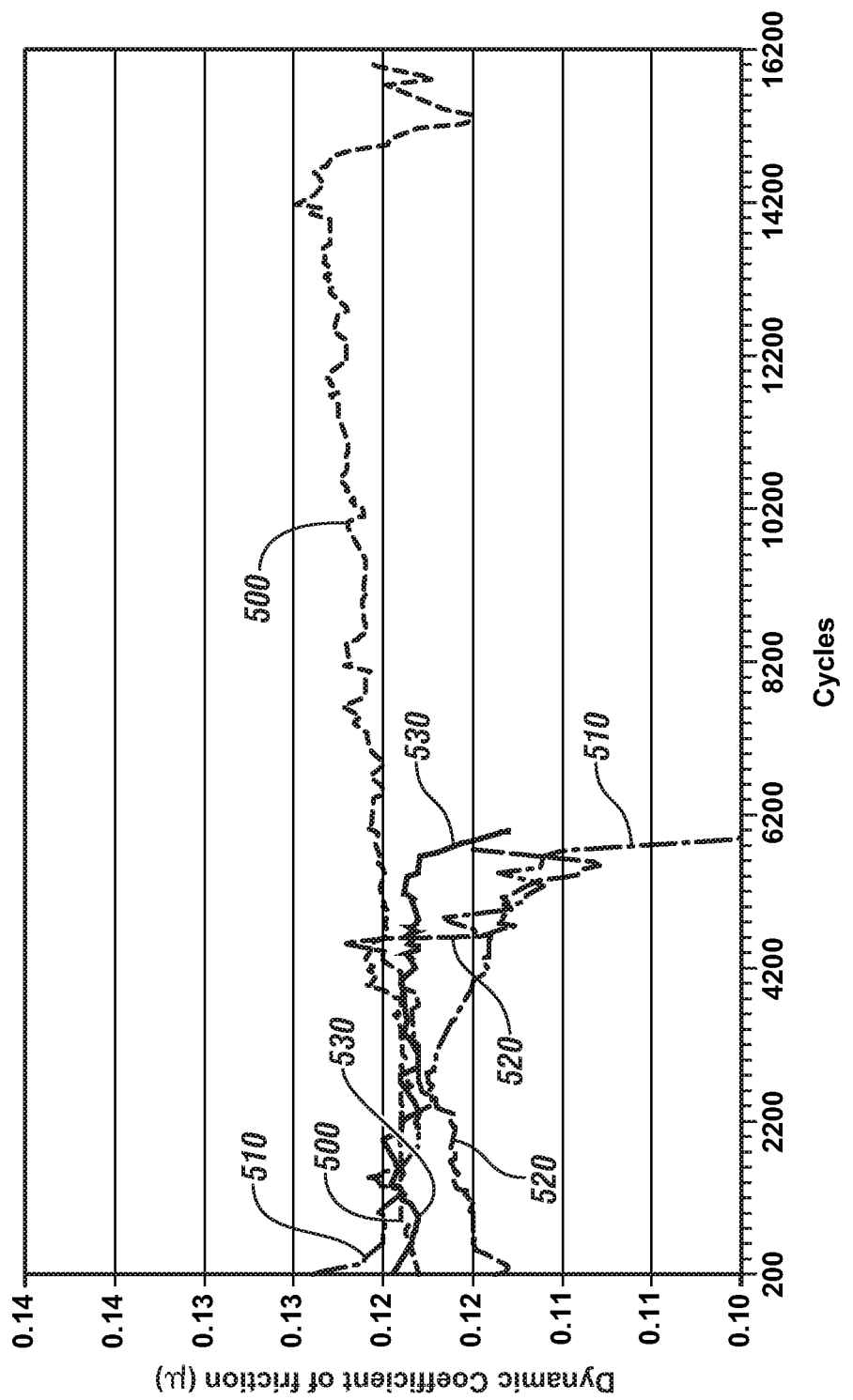
FIG. 5 is a graph that plots dynamic coefficient of friction against the number of friction material engagement/disengagement for several conventional friction materials (510, 520, 530) and a friction material having a friction stability region (500).

This Example demonstrates the frictional performance of a pair of friction materials that included a friction stability region (hereafter referred to as "friction material A" and "friction material B" for brevity). Friction material A and at least one conventional friction material without such a feature were each subjected to a high-temperature launch durability test (FIG. 4) and a high-temperature shifting clutch durability test (FIG. 5). Friction material A was formed from a base fibrous material that comprised, at the top surface of the base fibrous material, 4 lbs of fibrillated cellulose nanofibers that supported 15 lbs of diatomaceous earth particles at the friction stability region per 3000 ft$^2$ of the friction material. The fibrillated cellulose nanofibers used were a blend of natural cellulose and lyocell regenerated cellulose that had diameters ranging from 50 to 500 nm, lengths of about 4 mm, and a degree of fibrillation of about 40 ml CSF. The diatomaceous earth particles had diameters ranging from about 2 μm to about 50 μm. A phenolic resin was impregnated into the base fibrous material and cured. The conventional friction material was formed from a base fibrous material that did not include a comparable friction stability region.

The high-temperature launch durability test was conducted on a GK II test bench. A production launch clutch fixture and the corresponding application DCT fluid were used to simulate the operating environment of a dual-clutch transmission at vehicle launch. The application DCT fluid was supplied to the friction interfacing surface of the friction materials at a flow rate of 8 L/min. This flow rate, which was meant to replicate a low-lubricant flow environment, caused the temperature at the friction interfacing surface of the friction materials and their opposed mating surfaces to reach 350° C. The launch test had the following additional test parameters: maximum power of 73.3 KW; energy of 146.6 KJ; specific net power of 2.36 W/mm$^2$; lining pressure of 0.85 MPa; and a maximum rotational speed of 2500 rpm. Measurements of friction torque gradient (the difference in the friction material's coefficient of friction at a rotational speed of 500 rpm and 200 rmp) for each friction material were plotted against the number of friction material engagement/disengagement cycles as shown in FIG. 4. A positive frictional torque gradient is generally representative of a good μ-v relationship and quality frictional performance. A negative frictional torque gradient, on the other hand, is generally indicative of glazing. As can be seen, friction material A (numeral 400) maintained a positive torque gradient after 18,000 cycles while the conventional frictional material (numeral 410) transitioned to a negative frictional torque gradient after 8,000 cycles.

The high-temperature shifting clutch durability test was conducted on a SAE no. 2 machine in accordance with SAE procedure J2487 (level 7) in the presence of the application DCT fluid. Friction material A and several different conventional friction materials were tested. The durability test parameters were: energy of 32.45 KJ; specific net power of 2.68 W/mm$^2$; and a rotational speed of 3600 rpm. Measurements of the dynamic coefficient of friction for each friction material were plotted against the number of friction material engagement/disengagement cycles as shown in FIG. 5. As can be seen, friction material A (numeral 500) maintained a steady dynamic coefficient of friction past 14,200 cycles, which would contribute to a positive μ-v relationship, while the several conventional friction materials (numerals 510, 520, and 530) suffered dynamic coefficient of friction declines early in the test procedure within 2,000 to 6,000 cycles.

Figure 6:
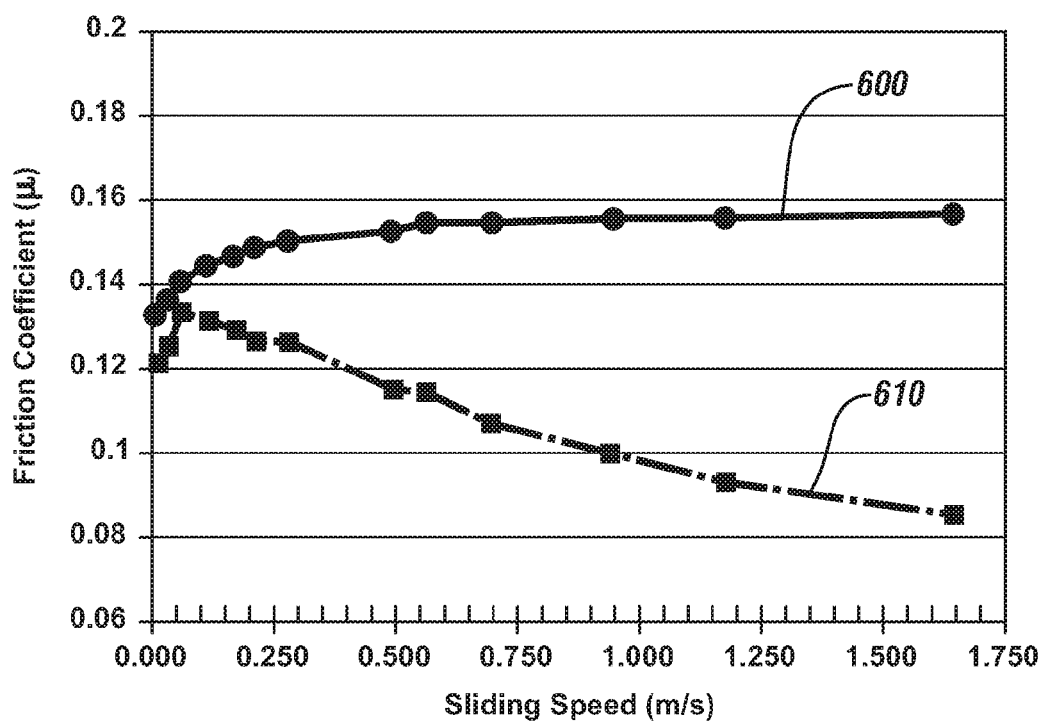
FIG. 6 is a graph that plots coefficient of friction against the slipping speed for a conventional friction material (610) and a friction material having a friction stability region (600).

Friction material B and a conventional friction material without a comparable friction stability region were each subjected to a high-temperature slipping clutch durability test (FIG. 6) similar to the one depicted before (see FIG. 5). Friction material B was the same as friction material A except 9 lbs of fibrillated cellulose nanofibers instead of 4 lbs were present at the top surface of the base fibrous material, per 3000 ft$^2$ of the friction material, to form the friction stability region. The high-temperature slipping clutch durability test was conducted on a SAE no. 2 at 90° C. with different slipping speeds up to 1.75 m/s. The lining pressure was 1.6 MPa and an appropriate application fluid lubricant was used. As can be seen, friction material B (numeral 600) exhibited an increasing coefficient of friction with increasing slipping speed, which contribute to a positive μ-v relationship, while the conventional friction material (610) generally suffered a coefficient of friction decline under the same conditions.

The above description of illustrative embodiments and the specific example are merely descriptive in nature and not intended to limit the scope of the claims that follow.

The invention claimed is:

1. A wet friction material comprising:
a friction interfacing surface for experiencing frictional engagement with an opposed surface in the presence of a lubricant, at least a portion of the friction interfacing surface comprising fibrillated nanofibers that define a nanofibrous web and friction adjusting particles held by the nanofibrous web.

2. The wet friction material of claim 1, further comprising:
base structural fibers intermingled with the fibrillated nanofibers.

3. The wet friction material of claim 2, wherein the base structural fibers are exposed at the friction interfacing surface along with the fibrillated nanofibers and the friction adjusting particles.

4. The wet friction material of claim 2, wherein the base structural fibers are not exposed at the friction interfacing surface.

5. The wet friction material of claim 1, wherein the fibrillated nanofibers have diameters that range from about 50 nm to about 500 nm, lengths that range from about 1 mm to about 10 mm, and a degree of fibrillation that ranges from about 10 mL CSF to about 300 mL CSF as measured by Canadian Standard Freeness.

6. The wet friction material of claim 1, wherein the fibrillated nanofibers comprise cellulose, an aramid, or an acrylic.

7. The wet friction material of claim 1, further comprising a thickness defined by a distance between the friction interfacing surface and an oppositely facing bonding surface, and wherein the fibrillated nanofibers and the friction adjusting particles held by the nanofibrous web are present in a friction stability region of the wet friction material that extends from the friction interfacing surface towards the oppositely facing bonding surface to a depth up to about 40% of the thickness of the wet friction material.

8. The wet friction material of claim 1, wherein the friction adjusting particles have diameters that range from 100 nm to about 80 μm and are comprised of materials that do not melt, soften, or decompose at a temperature below 400° C.

9. The wet friction material of claim 8, wherein the friction adjusting particles comprise at least one of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew dust, a cured phenolic, or mixtures thereof.

10. The wet friction material of claim 9, wherein the friction adjusting particles comprise diatomaceous earth.

11. The wet friction material of claim 1, further comprising a cured resin that adheres the fibrillated nanofibers and the friction adjusting particles.

12. A wet friction material that includes a friction interfacing surface for experiencing frictional engagement with an opposed surface in the presence of a lubricant and an oppositely facing bonding surface for bonding the friction material to a base substrate, the friction material comprising:
 a base fibrous material that includes a top surface coincident with or proximate the friction interfacing surface of the friction material and a bottom surface coincident with or proximate the oppositely facing bonding surface, the base fibrous material supporting a friction stability region of the wet friction material that extends from the friction interfacing surface of the wet friction material towards the oppositely facing bonding surface, the friction stability region comprising fibrillated nanofibers and friction adjusting particles held in a nanofibrous web formed by the fibrillated nanofibers, the fibrillated nanofibers comprising fibrillated cellulose nanofibers; and
 a cured resin that adheres the base fibrous material and the fibrillated cellulose nanofibers and friction adjusting particles included in the friction stability region.

13. The wet friction material of claim 12, wherein the friction interfacing surface and the oppositely facing bonding surface are separated by a distance, and wherein the friction stability region extends away from the friction interfacing surface towards the oppositely facing bottom surface to a depth up to about 40% of the distance between the friction interfacing surface and the oppositely facing bonding surface.

14. The wet friction material of claim 12, wherein the fibrillated nanofibers have diameters that range from about 50 nm to about 500 nm and a degree of fibrillation that ranges from about 10 mL CSF to about 300 mL CSF as measured by Canadian Standard Freeness.

15. The wet friction material of claim 14, wherein the fibrillated nanofibers have lengths that range from about 1 mm to about 10 mm.

16. The wet friction material of claim 12, wherein the fibrillated cellulose nanofibers comprise at least 50 wt. % of natural cellulose, regenerated cellulose, a cellulose derivative, or a mixture thereof.

17. The wet friction material of claim 16, wherein the fibrillated cellulose nanofibers comprise regenerated lyocell cellulose.

18. The wet friction material of claim 16, wherein the fibrillated cellulose nanofibers comprise a blend of natural cellulose and regenerated lyocell cellulose.

19. The wet friction material of claim 12, wherein the friction adjusting particles have diameters that range from 100 nm to about 80 μm and are comprised of materials that do not melt, soften, or decompose at a temperature below 400° C.

20. The wet friction material of claim 19, wherein the friction adjusting particles comprise at least one of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew dust, a cured phenolic, or mixtures thereof.

21. The wet friction material of claim 19, wherein the friction adjusting particles comprise diatomaceous earth.

22. A method comprising:
 providing a wet clutch in which a wet friction material and an opposed surface are configured for selective interfacial frictional engagement, the wet friction material having a friction interfacing surface that comprises a friction stability region extending from the friction interfacing surface into the friction material, the friction stability region comprising fibrillated nanofibers and friction adjusting particles held in a nanofibrous web formed by the fibrillated nanofibers;
 delivering a flow of lubricant over the friction interfacing surface of the friction material, the friction interfacing surface having a friction interface temperature;
 engaging the friction interfacing surface of the friction material with the opposed surface to interlock the friction interfacing surface and the opposed surface together; and
 managing the flow of the lubricant at the friction interfacing surface such that the friction interface temperature exceeds 350° C. and the fibrillated nanofibers at the friction stability region adjacent to the friction interfacing surface thermally decompose to constantly expose fresh, underlying fibrillated nanofibers.

23. The method of claim 22, wherein the fibrillated nanofibers comprise fibrillated cellulose nanofibers.

24. The method of claim 22, wherein the wet friction material further comprises a thickness defined by a distance between the friction interfacing surface and an oppositely facing bonding surface, and wherein the friction stability region of the wet friction material extends from the friction interfacing surface towards the oppositely facing bonding surface to a depth up to about 40% of the thickness of the wet friction material.

25. The method of claim 24, wherein the friction material comprises a base fibrous material that supports the friction stability region and a cured resin that adheres the base fibrous material and the fibrillated nanofibers and friction adjusting particles included in the friction stability region, the base fibrous material having a top surface coincident or proximate the friction interfacing surface of the friction material and a bottom surface coincident or proximate the oppositely facing bonding surface.

26. The method of claim 25, wherein the base fibrous material comprises base structural fibers having diameters that range from about 1 μm to about 500 μm and lengths that range from 2 mm to about 20 mm.

27. The method of claim 24, wherein the wet friction material comprises about 1 lbs to about 15 lbs of the fibrillated nanofibers in the friction stability region, and about 2 lbs/ft² to 20 lbs/ft² of the friction adjusting particles in the friction stability region, all based on 3000 ft² of the wet friction material.

28. The method of claim 22, wherein the fibrillated nanofibers have diameters that range from about 50 nm to about 500 nm, lengths that range from about 1 mm to about 10 mm, a degree of fibrillation that ranges from about 5 mL CSF to about 300 mL CSF as measured by Canadian Standard Freeness, and wherein the friction adjusting particles have diameters that range from 100 nm to about 80 μm and comprise at least one of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew dust, a cured phenolic, or mixtures thereof.

* * * * *